United States Patent [19]

Walker

[11] Patent Number: 5,282,520
[45] Date of Patent: Feb. 1, 1994

[54] PORTABLE HUNTING STAND AND GAME CARRIER

[76] Inventor: Bret T. Walker, 8414 Rocky Path, San Antonio, Tex. 78250

[21] Appl. No.: 846,714

[22] Filed: Mar. 6, 1992

[51] Int. Cl.$^5$ .................... A01M 31/02; A45F 3/26
[52] U.S. Cl. .................... 182/116; 182/187; 182/163; 182/21
[58] Field of Search ............... 182/187, 188, 129, 116, 182/163, 21

[56] References Cited

U.S. PATENT DOCUMENTS

| | | | |
|---|---|---|---|
| 3,282,375 | 11/1966 | Ray | 182/116 |
| 3,289,787 | 12/1966 | McSwain . | |
| 3,336,999 | 8/1967 | McSwain . | |
| 4,045,040 | 8/1977 | Fails . | |
| 4,552,246 | 11/1985 | Thomas . | |
| 4,742,888 | 5/1988 | Amacker | 182/116 |
| 5,016,732 | 5/1991 | Dunn . | |
| 5,195,611 | 3/1993 | Untz | 182/187 |

*Primary Examiner*—Alvin C. Chin-Shue
*Attorney, Agent, or Firm*—Richard C. Litman

[57] ABSTRACT

A portable hunting blind or observation and hunting stand, and wheeled carrier is provided. The unit is foldable and has lower, central and upper ladder elements interconnected by securable hinges. A wheel is located on the lower ladder element and a rotatable tree mounting element is disposed on the upper ladder element. The upper ladder element also has a seat platform and a separate standing platform located on the upper ladder element below the tree attaching element. The tree attaching element comprises a rotatable C-shaped portion with a nylon strap having a first end and a second end. The first end is secured to the C-shaped portion, the intermediate strap surrounds the tree trunk and the second end is placed in a ratchet style strap tightener which permits adjustment according to the circumference of the tree. The C-shaped portion is rotatable about two axes and legs may be inserted into this portion, the stand being free standing in tripod fashion. When folded the hunting blind becomes a carcass transporter, permitting one to easily wheel the kill to the game warden or vehicle.

10 Claims, 5 Drawing Sheets

PORTABLE HUNTING STAND AND GAME CARRIER

FIELD OF THE INVENTION

The present invention relates to a elevated hunting platform. More specifically the present invention relates to a portable hunting stand and observation post which converts into a litter for dragging away the kill.

DESCRIPTION OF THE PRIOR ART

Portable hunting and observation stands are known in art. U.S. Pat. No. 3,289,787 issued to Thad McSwain on Dec. 6, 1966 discloses a collapsible hunting shelter. The shelter provides an upraised vantage point and is designed to be collapsible. The shelter includes an enclosed elevated stand which is accessible by a ladder. The stand is supported by four legs and includes a roof. Although portable, this invention is bulky and difficult to assemble.

U.S. Pat. No. 3,336,999 issued to Thad McSwain on Aug. 22, 1967 discloses a hunting stand. The stand includes a ladder supporting a platform attached to a tree by a pair of pincers. The stand may be converted into a litter or carrying device by the addition of a wheels or skids. The entire stand may be collapsed into a compact form for transport.

U.S. Pat. No. 4,045,040 issued to Hershell Falls on Aug. 30, 1977 discloses a deer stand and game carrier. The carrier has a framework, a back pack connection at one end of the framework, and a pair of wheels mounted on the other end of the framework. A ladder is mounted intermediate the backpack and the wheels. The ladder is to be pivotably mounted on the framework and moved into stand position, with the backpack portion being utilized as a stand seat. The framework is composed of telescoping members to permit the legs to be extended as desired.

U.S. Pat. No. 4,552,246 issued to A. Lynn Thomas on Nov. 12, 1985 discloses a portable hunter tree stand. The tree stand comprises a rigid, spike equipped, seat for supporting a hunter above ground adjacent to and in contact with a tree. The stand further includes a foot rest located slightly in front and below the seat. A U-shaped yoke connects the seat to the foot rest.

U.S. Pat. No. 5,016,732 issued to Stewart Dunn on May 21, 1991 discloses a portable combination hunting and observation stand. The hunting stand includes a three portion ladder which is connected matingly about the side rails. The upper portion of the ladder has a foot rest and a seat connected thereto. The upper portion also has an element designed to be attached to a tree. The upper portion of the ladder structure may also be used as a sled for pulling game back to a central location. Also the stand may be assembled in such a fashion to be man portable on a backpack.

None of the above referenced devices, considered either singly or in combination, is seen to suggest the instant invention as claimed.

SUMMARY OF THE INVENTION

The present invention relates to a portable hunting stand and observation post. The stand is provided with a ladder assembly which includes three sections which are foldable about each other. The lower portion of the ladder assembly has a wheel mounted thereto. The upper portion of the ladder assembly has a seat platform and a separate standing platform located intermediate the side rails of the ladder. A C-shaped element is located on the upper portion of the ladder assembly. Also, this C-shaped element is pivotable about two axes and has a strap located thereon to attach the ladder to a tree. The three sections of the ladder assembly which are foldable about each other include a locking mechanism for holding the three sections of the assembly securely in a folded or extended (unfolded) position.

In a second embodiment of the hunting stand, two legs are mounted on the upper portion of the latter through a mounting portion. These legs are foldable and pivotable about the mounting portion. The legs and the ladder form a self standing and supporting hunting stand which does not require a tree to lean against.

Accordingly, one object of the present invention is to provide a combination portable hunting stand and carcass carrier.

Another object of the present invention is to provide a hunting stand which is both quiet and easy to assemble.

Another object of the present invention is to provide a self standing and supportable hunting stand and carcass carrier.

Another object of the present invention is to provide a foldable ladder assembly which may be secured in a folded or extended (unfolded) manner.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
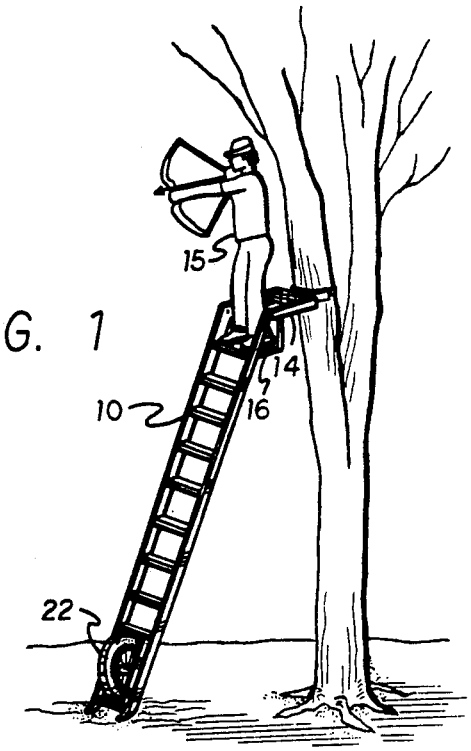
FIG. 1 is an environmental perspective view of the portable hunting stand and observation post.

The present invention is drawn to a portable hunting stand or observation post 10. Referring now specifically to FIG. 1, the first embodiment of the hunting stand 10 is shown attached to a tree 12. A seat platform 14 and separate standing platform 16 are shown. A hunter 15 is shown standing on the separate standing platform 16. The hunting stand 10 is connected to the tree 12 by a nylon strap 18 connected to a C-shaped pivotable element 20. A wheel 22 is rotatably mounted on the bottom of the stand 10 which gives the stand its portability.

Figure 2:
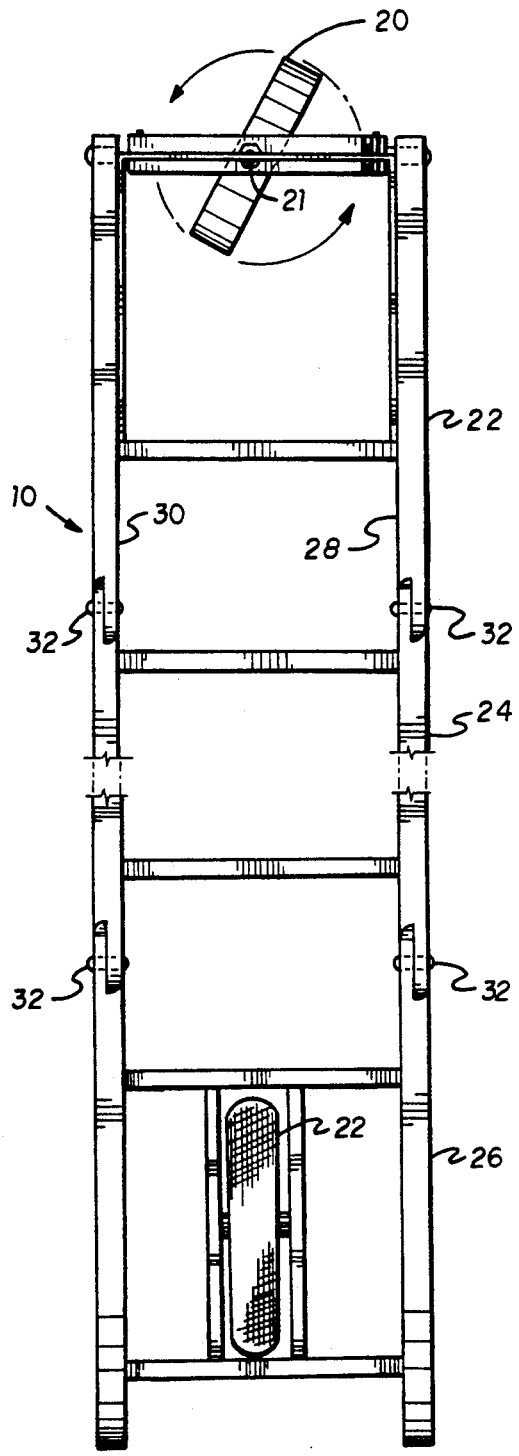
FIG. 2 is a front elevational view of the portable hunting stand and observation post showing the pivotable tree fastening means.

Referring now to FIG. 2 the hunting stand 10 is shown by a front elevational view. The ladder assembly is shown in three sections, an upper section 22, an intermediate section 24, and a lower section 26. Each section has a right 28 and a left rail 30 associated with it. The ladder assembly is foldable at the intersection of the of the upper section and the intermediate section, and it is also foldable at the intersection of the intermediate section and the lower section. The folding action is caused by rotation about a central pin 32. Several variants of the locking mechanism located about the central pin 32 will be presented later in this discussion.

Figure 3:
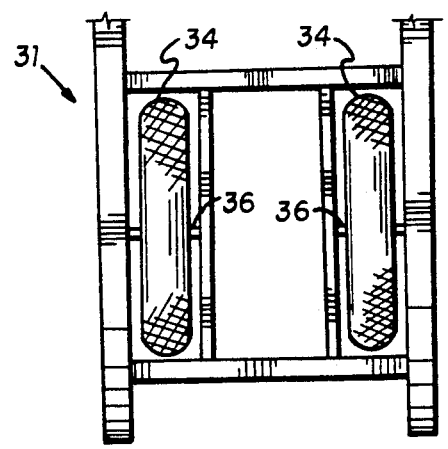
FIG. 3 is a partial front elevational view showing a variant of the hunting stand which includes two wheels.

FIG. 3 shows a variant of the wheel assembly 31 which includes two wheels 34. These wheels 34 are mounted each on a shaft member 36. The two wheel variant adds stability when utilizing the stand in its carcass carrier capacity.

Figure 4:
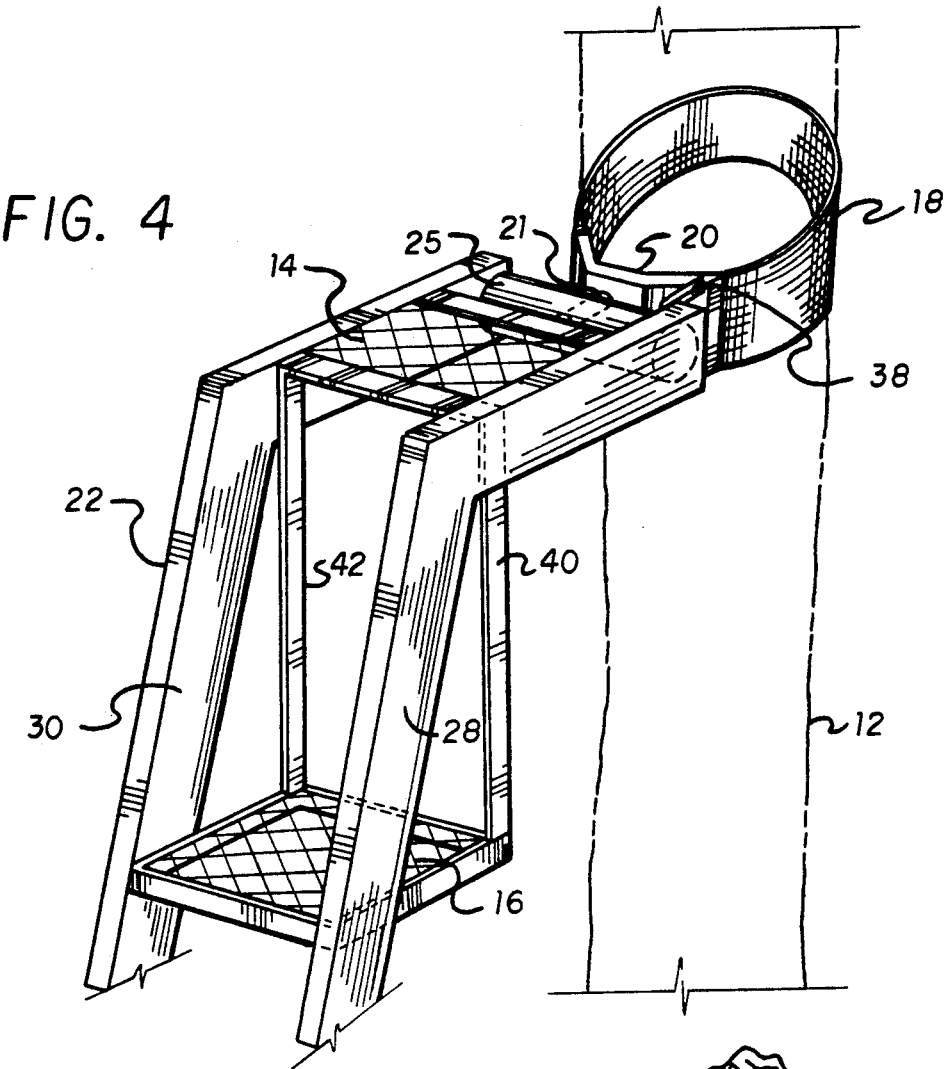
FIG. 4 is a partial perspective view of the hunting stand showing the upper part of the ladder assembly.

The upper section 22 of the ladder assembly has both a standing platform 16 and a separate seat platform 14. Referring now to FIG. 4, the seat platform 14 is shown attached to the right 28 and the left rail 30 of the upper section 22 of the ladder assembly. The standing platform 16 is located below the seat platform 14 and is connected to the seat platform 14 by a right 40 and a left bar member 42. The standing platform 16 is also connected to the right 28 and left rail 30 of the upper section 22 of the ladder assembly.

A pivotable C-shaped element 20 is connected to the end of the upper section 22 of the ladder assembly. This element 20 has a nylon strap 18 connected permanently to its right hand side and a strap receiving device 38 located on its left hand side. The C-shaped element 20 is placed proximal to a tree trunk 12 or limb. The nylon strap 18 encircles the tree portion 12 and is tightened by a ratchet and pawl type mechanism located on the strap receiving device 38.

Figure 5:
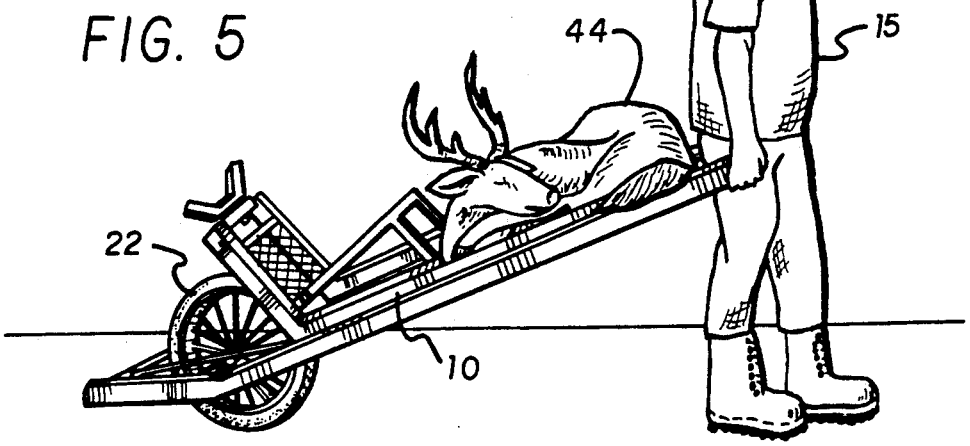
FIG. 5 is a perspective view of the hunting stand after it has been converted into a carcass carrier.

The hunting stand and observation post 10 may be converted into a carcass carrier by folding the ladder assembly about its fold or rotation points. The converted stand is shown in FIG. 5 with a game animal 44 being taken by the hunter 15 to another location. The lightweight construction of the stand 10, in addition the mounted wheel 22, permits the hunting stand, when folded, to be easily carried over most terrain.

Figure 6:
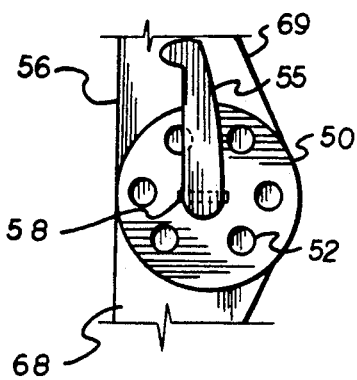
FIG. 6 is a partial side elevational view showing a first variant of the locking hinge assembly.
Figure 7:
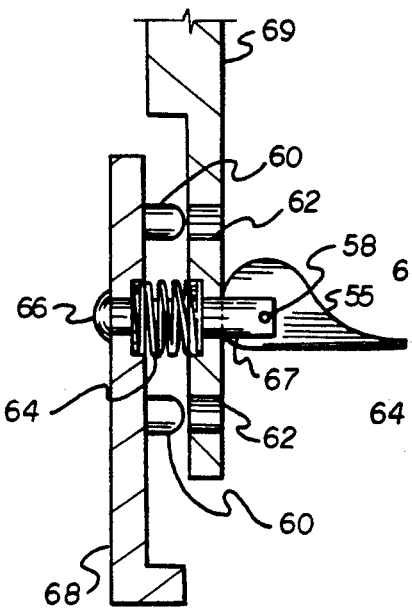
FIG. 7 is a cross sectional view showing the first variant of the hinge assembly in an open position.
Figure 8:
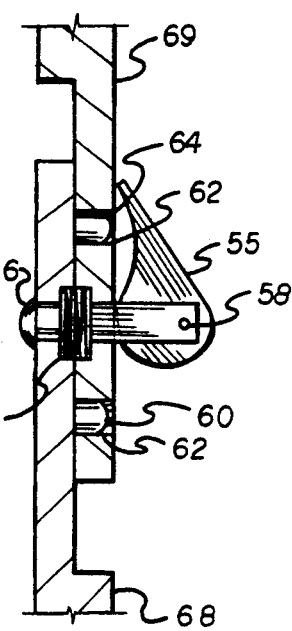
FIG. 8 is a cross sectional view showing the first variant of the hinge assembly in the closed and locked position.

FIGS. 6–8 shows a first variant of a mechanism designed to lock the ladder assembly in both a folded and unfolded state. This first variant 50 involves a cam 58 which pulls the upper rail portion 69 together with the lower rail portion 68. A pin has a head 66 and a shank 67 and connects the two rail portions (68, 69). A spring 64 is nested on the shank 67. A cam 55 is pivotably connected to the end of the shank 67 by a small pin element 58. The lower rail portion 68 has two male members 60 which matingly connect to the upper rail portion 69. Upper rail portion 69 has a plurality of holes 62 designed to receive the male members 60. When the locking mechanism is not engaged the upper portion 60 can rotate about pin shank 66. FIG. 7 shows the mechanism 50 in the unlocked position whereas FIG. 8 shows the mechanism in its locked position.

Figure 9:
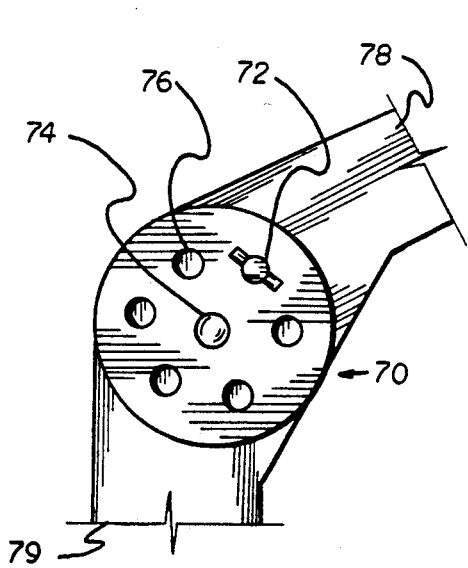
FIG. 9 is a partial side elevational view showing a second variant of the locking hinge assembly.
Figure 10:
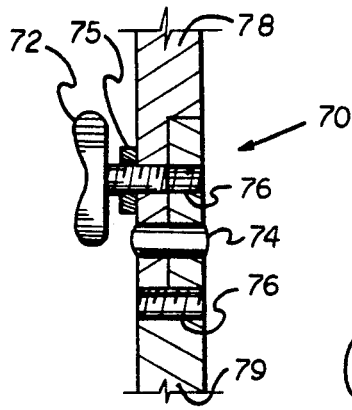
FIG. 10 is a cross sectional view showing the second variant of the hinge assembly in an open position.
Figure 11:
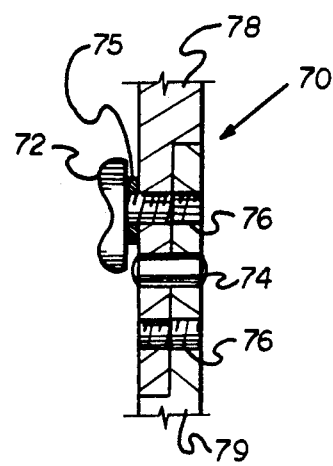
FIG. 11 is a cross sectional view showing the second variant of the hinge assembly.

FIGS. 9–11 show a second and preferred embodiment of the mechanism 70 designed to lock the ladder assembly in both a folded and unfolded state. A thumbscrew 72 is provided which will secure the upper rail portion 78 to the lower rail portion 79. The thumbscrew 72 is designed to mate with one of a plurality of holes 76. A central pin 74 permits rotation of the upper rail portion 78 with respect to the lower rail portion 79. A washer 75 is positioned in between the head of the thumbscrew 72 and one of the plurality of holes 76. FIG. 10 shows the mechanism 70 in the unlocked position and FIG. 11 shows the mechanism in the locked position.

Figures 12, 13:
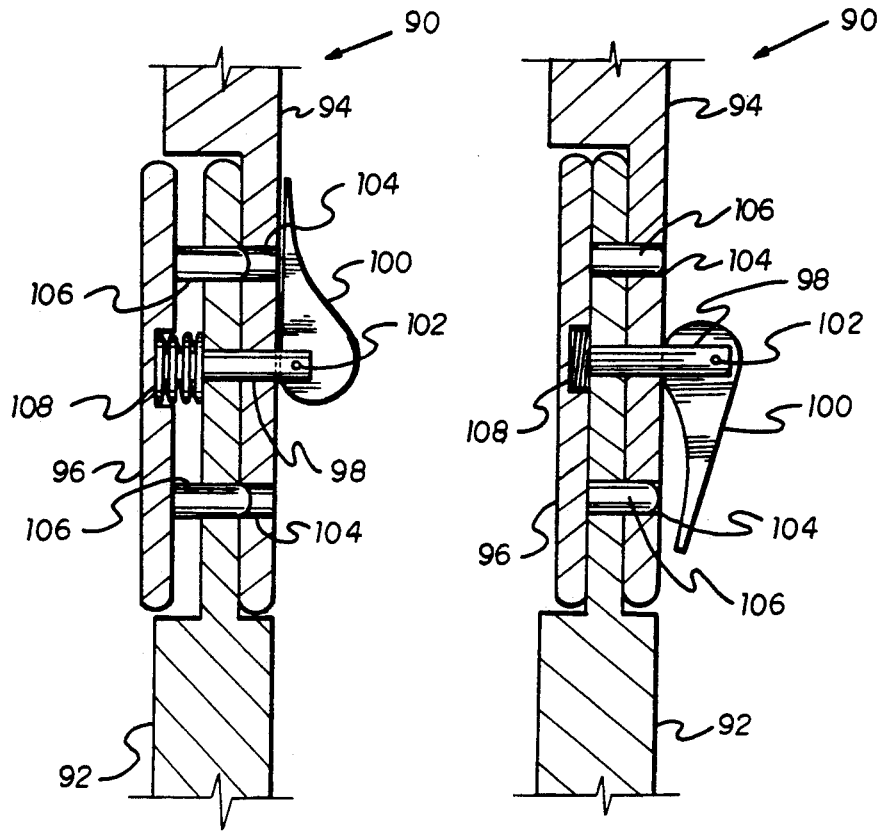
FIG. 12 is a cross sectional view showing the third variant of the hinge assembly in the open position.
FIG. 13 is a cross sectional view showing the third variant of the hinge assembly in the closed position.

FIGS. 12 and 13 shows a third variant of the mechanism 90 designed to lock the ladder assembly in both a folded and unfolded state. A plate 96 has two male members 206 and a central pin 98 located on it. The central pin passes through the lower rail portion 92 and the upper rail portion 94. At the end of the shaft of the central pin 98 a cam 100 is located. The cam 100 is secured pivotably to the shaft of the central pin 98 by element 102. A plurality of holes 104 are designed to receive male members 106. These male members 106 are brought into two of the holes 104 through actuation of the cam member 100. A spring 106 is nested on the shaft of the central pin 98 between plate 96 and lower rail portion 92. The mechanism 90 is shown in its locked position in FIG. 12, and is shown in its unlocked position in FIG. 13.

Figure 14:
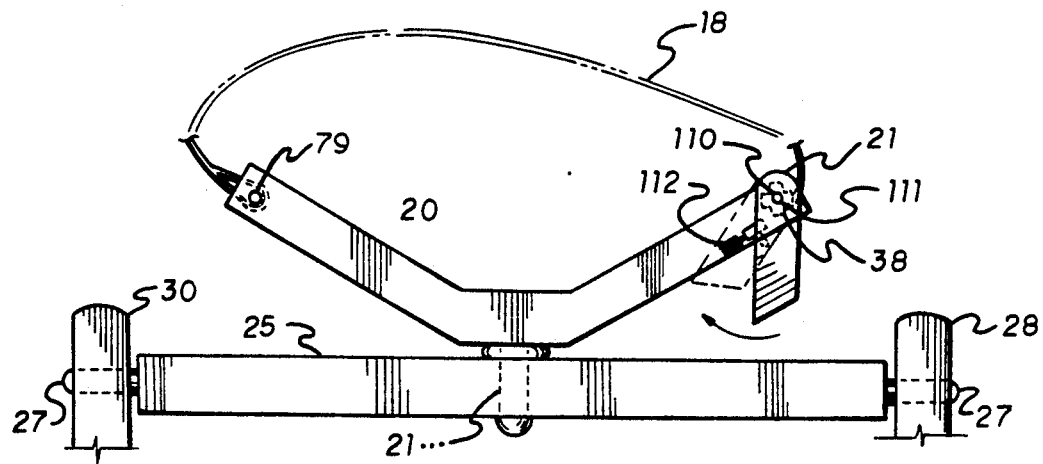
FIG. 14 is a detail of the tree fastening means showing the ratchet and pawl assembly.

FIG. 14 illustrates the mechanism which holds the hunting stand 10 to the tree 12. A nylon strap 18 is permanently affixed to the right hand side of the c-shaped element 20 at point 19. The C-shaped element 20 engages the tree portion and the nylon strap encircles that portion. It is important to note that C-shaped element 20 is rotatable about its stub axle mounting 21, as seen in FIG. 1, and also about a second, transverse axis defined by a dowel 25, which mounts stub axle mounting 21, which in turn is rotatably mounted in the upper ends of upper rails 28 and 30 by pin axles 27, as best seen in FIG. 14. With reference to FIG. 4, rotation of dowel 25 upwardly may be limited, so that the user does not try to encircle strap 18 about a horizontal tree limb that might extend over and block seat platform 14.

The distal end of the nylon strap 21 is engaged by a strap tightening device 38. This strap tightening device includes a spring loaded pawl 112 which engages a ratchet 110 about a spindle 111. The nylon strap is thus tightened by actuation of the ratchet. The ratchet 110 and pawl 112 as well as the spindle 111 are conventional.

While a ratchet and pawl assembly and spindle are shown for securing the upper part of the stand to a tree, other securing arrangements are feasible. For example, a length of cord tied to the two ends of element 20 can be used, or a convenient length of cable or link chain could be employed.

A self standing hunting and observation stand 120 is presented as a second embodiment of the invention. A ladder assembly is provided with an upper element 124 and a lower element 126. The elements fold about each other at pivot or fold points 130. Each of the ladder elements include a right rail 140 and a left rail 142. A wheel 122 is provided on the lower element 128 and is mounted on a shaft 123. The pivot or fold points 130 include the previously described locking mechanisms which permit the stand 120 to be locked in either a folded or unfolded position.

A right 132 and a left leg 134 are mounted to the upper element 122 of the ladder assembly by a small C-shaped element 146. This element rotates about stub axle 21, as in the first embodiment. Similarly, dowel or top ladder rung 25 is provided which is rotatably mounted by pin axles in the upper ends of the rails 140 and 142.

The right 132 and the left leg 134 each have a point of rotation 135 which permits the legs 132, 134 to be folded generally parallel one another so as to lie to either side of wheel 122 when the invention is collapsed for transport; the folded appearance is about the same as that in the first embodiment as shown in FIG. 5. A support member 137, such as a length of plastic coated cable, connects the right leg 132 to the left leg 134. In this manner, support member 137 provides additional structural stability to the tripod formed by the two legs and the ladder assembly.

Figure 15:
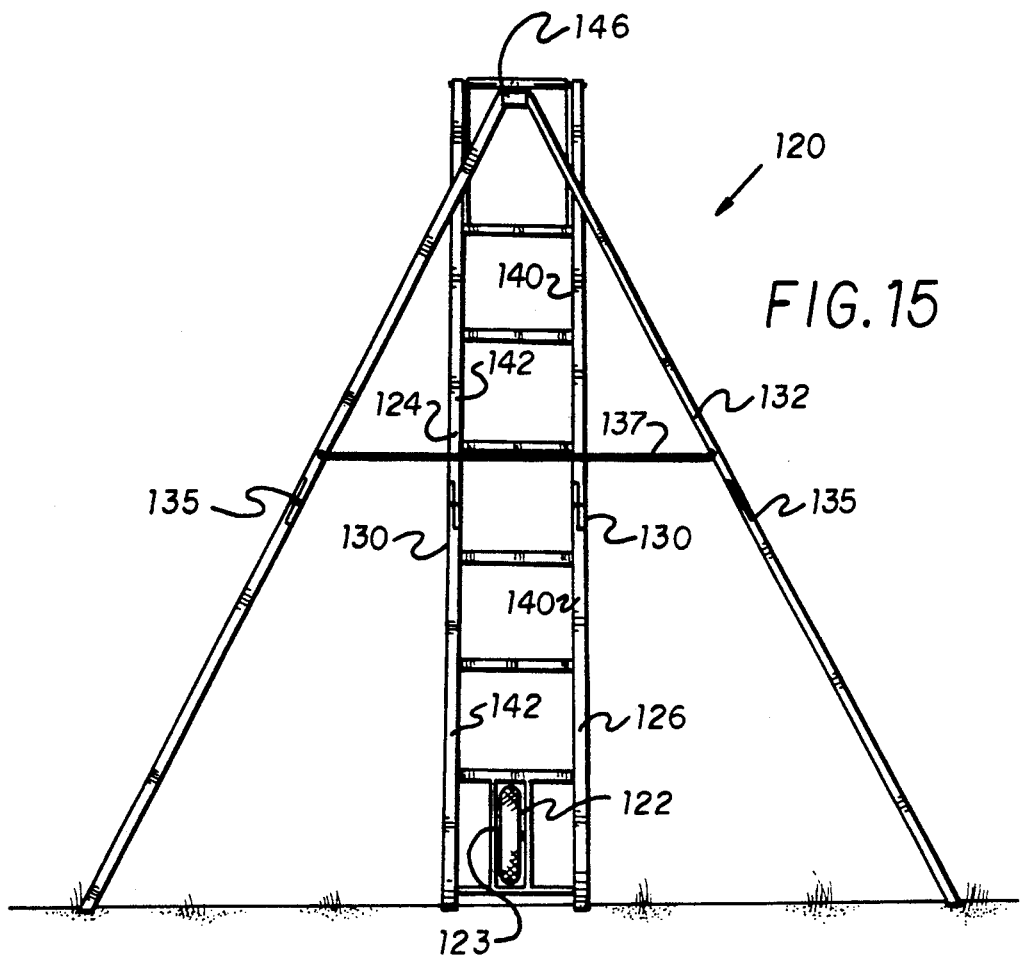
FIG. 15 is front elevational view of the second embodiment of the invention showing the hunting stand and observation post being supported in tripod fashion.
Figure 16:
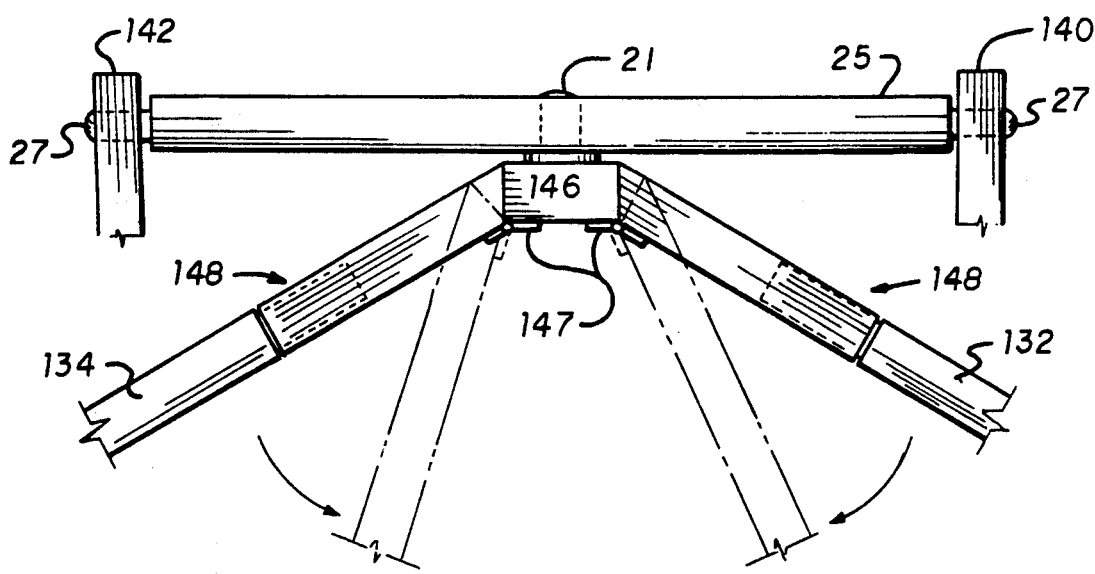
FIG. 16 is a detail of the hinge assembly showing the attachment of the tripod legs to the ladder assembly.

Hinges 147 are provided on the small C-shaped member 146 which permit the right 132 and left leg 134 to rotate. The right 132 and left leg 134 are connected to the C-shaped member 146 by being telescoped into open ends thereof as shown at 148. Preferably, hinges 147 are otherwise conventional coil spring loaded hinges so as to urge the C-shaped member 146 into the open disposition shown in FIGS. 15 and 16. Also, C-shaped member may be provided with the strap, ratchet and pawl mechanism and spindles of the first embodiment, so the user has the option of either attaching the invention to a tree trunk or limb or employ the tripod configuration of this embodiment.

This embodiment of the hunting stand 120 may be erected anywhere and does not depend on a tree for support. The two legs 132, 134 and the ladder assembly form a tripod from which one can hunt or observe game.

It is to be understood that the present invention is not limited to the embodiments described above, but encompasses any and all embodiments within the scope of the following claims.

I claim:

1. A portable observation and hunting stand comprising:
   a ladder assembly, said ladder assembly having foldably connected elements including a lower element, an intermediate element, and an upper element, said lower, intermediate, and upper ladder element each having a right rail and left rail, said lower element and said upper element being foldably connected to said intermediate element, said foldably connected elements further having securing means for securing said stand in a folded and unfolded configuration, said securing means located on said right and said left rails, said upper element having a C-shaped portion mounted thereto for rotation in two axes, and with a nylon strap means attached thereto, said upper element further having a seat platform and a separate standing platform, said seat platform and said standing platform located intermediate said right and left rails, whereby
   said stand is unfolded and leaned up against a tree and said nylon strap encircles the tree and secures said stand thereto.

2. A hunting stand as claimed in claim 1 wherein said securing means include a cam mechanism.

3. A hunting stand as claimed in claim 1 wherein said securing means includes a thumbscrew.

4. A hunting stand as claimed in claim 1 wherein said C-shaped portion includes tightening means for said strap means.

5. A hunting stand as claimed in claim 4 wherein said tightening means includes a spindle, a ratchet and a pawl.

6. A hunting stand as claimed in claim 1 wherein said strap means includes a nylon strap.

7. A hunting stand as claimed in claim 1 wherein said seat platform and said standing platform are connected by a first bar member and a second bar member.

8. A hunting stand as claimed in claim 1 wherein said lower ladder element includes a wheel secured to a shaft, said shaft located intermediate said right and left rail.

9. A portable hunting and observation stand comprising:
   a ladder assembly, said ladder assembly having foldably connected elements including a lower element and an upper element, said lower and upper ladder element each having a right rail and a left rail, said lower element and said upper element being foldably connected to each other, said foldably connected elements further having securing means for securing said stand in a folded and unfolded configuration, said securing means located on said right and left rails, said upper element having a seat platform and a separate standing platform, said upper element further having support means attached thereto, whereby
   said support means and said ladder assembly form a platform from which a hunter may sit or stand upon, said support means further including a C-shaped portion mounted for rotation in two axes, and with a strap means attached thereto, whereby said stand may be leaned against a tree with said strap means encircling a portion of the tree to secure the stand thereto.

10. A hunting stand as claimed in claim 9 wherein said lower ladder element includes a wheel secured to a shaft, said shaft located intermediate said right and left rail.

* * * * *